United States Patent

McGrane

[11] Patent Number: 5,879,598
[45] Date of Patent: Mar. 9, 1999

[54] METHOD AND APPARATUS FOR ENCAPSULATING ELECTRONIC COMPONENTS

[75] Inventor: Kevin McGrane, Bury St. Edmunds, United Kingdom

[73] Assignee: Electronic Techniques (Anglia) Limited, United Kingdom

[21] Appl. No.: 637,653
[22] PCT Filed: Oct. 21, 1994
[86] PCT No.: PCT/GB94/02315
    § 371 Date: Aug. 12, 1996
    § 102(e) Date: Aug. 12, 1996
[87] PCT Pub. No.: WO95/11790
    PCT Pub. Date: May 4, 1995

[30] Foreign Application Priority Data

Oct. 29, 1993 [GB] United Kingdom ............ 9322286

[51] Int. Cl.⁶ .................... B29C 39/08; B29C 39/10; B29C 39/42
[52] U.S. Cl. ............ 264/102; 264/271.1; 264/272.11; 264/311; 425/120; 425/434; 425/435; 425/546
[58] Field of Search .................. 264/311, 40.1, 264/102, 271.1, 272.11, 272.17, 328.4, 328.5; 425/546, 425, 434, 257, 812, 435, 447, 116, 117, 120

[56] References Cited

U.S. PATENT DOCUMENTS

| | | | |
|---|---|---|---|
| 2,413,401 | 12/1946 | Youngblood et al. | 264/328.5 |
| 4,374,080 | 2/1983 | Schroeder | 264/272.11 |
| 4,443,175 | 4/1984 | Rose et al. | 264/328.5 |
| 5,200,125 | 4/1993 | Osada | 264/39 |
| 5,665,281 | 9/1997 | Drummond | 264/272.17 |

*Primary Examiner*—Angela Ortiz
*Attorney, Agent, or Firm*—Dorn, McEachran, Jambor & Keating

[57] ABSTRACT

A centrifuge (18) is used to introduce a fluid, particularly a viscous fluid such as an encapsulating resin, into a cavity in a container (10), particularly a small cavity such as the inside of an electronic component housing. Measured quantities of the fluid are placed in dispensing vessels (28) in the centrifuge opposite the containers to be filled. The dispensing vessels have openings (36) through which the fluid can flow when centrifugal force is applied. On the application of this force, all the fluid flows out of the vessels into the containers.

19 Claims, 3 Drawing Sheets

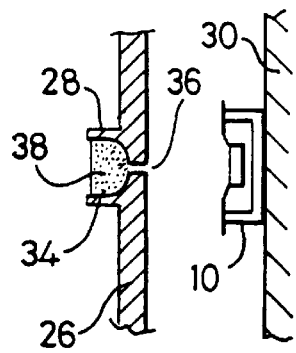
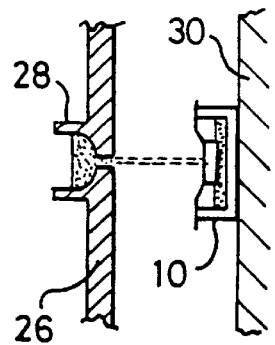
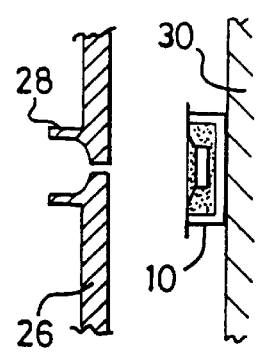
Fig. 4a  Fig. 4b  Fig. 4c
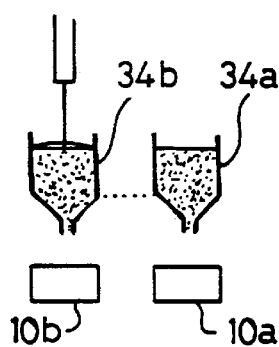
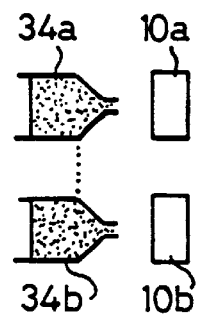
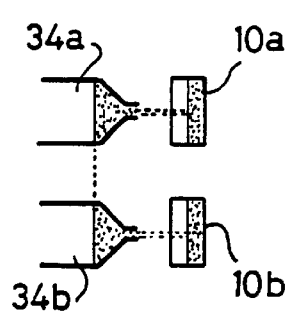
Fig. 5a  Fig. 5b  Fig. 5c
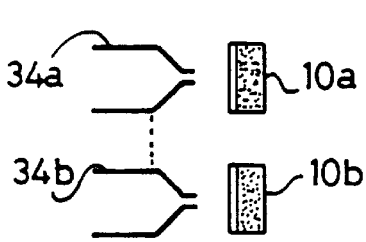
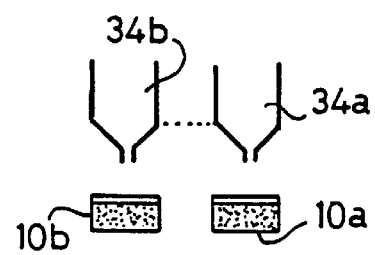
Fig. 5d  Fig. 5e
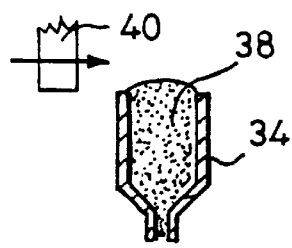
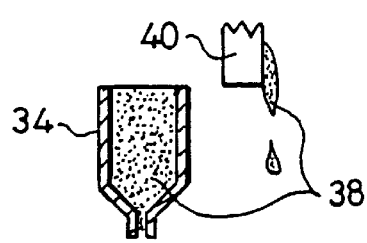
Fig. 6a  Fig. 6b

METHOD AND APPARATUS FOR ENCAPSULATING ELECTRONIC COMPONENTS

This invention relates to a method of encapsulating electronic components and also to an apparatus by which such components can be encapsulated. The invention extends to filling, casting, embedding, encapsulation, impregnation and potting applications. In such applications, typically a relatively high viscosity liquid resin is to be introduced into a small cavity, and a particular use for which the invention is envisaged is the introduction of encapsulating resins into housings for electronic components.

It is known to make use of centrifugal force to assist the filling of mould cavities with fluid materials, for example molten metals or plastics. Such processes are known as "spin casting" or "centrifugal casting".

It is also known from British Patent Specification 2 241 465 to use centrifugal force to assist the filling of components with encapsulating resin. However in this specification an overfilling technique is described, and the top face of the components is closed during filling. This has the disadvantage that it is necessary to snap off an injection nozzle from the filled and cured component.

In prior art processes, a certain quantity of resin or other liquid remains in and hardens in a feed channel and is waste which is discarded.

According to the present invention there is provided a method of encapsulating components in an encapsulating liquid, the method comprising the steps of a locating components in respective chambers, each chamber having walls defining a cavity, and an opening, b providing a separate dispensing vessel for each chamber, c placing into each dispensing vessel the quantity of liquid required to encapsulate the components in the associated chamber, d placing the chambers and the dispensing vessels into a centrifuge so that the opening of each chamber, when the centrifuge is operating, lies radially outside of a dispensing opening of the dispensing vessel, with the chamber walls surrounding each cavity opening being out of contact with the dispensing vessel, e evacuating the centrifuge so that air is evacuated from the cavity before the liquid is introduced, and f operating the centrifuge so that all the liquid flows out of the dispensing opening, into the cavity and around the component through centrifugal force.

By charging the dispensing vessel with the exact quantity of liquid to be introduced into the cavity, the advantage is achieved that no liquid is wasted. This is of particular benefit when the liquid is a resin which cures, because once curing has taken place, recycling of the resin is no longer possible. Furthermore by suitably designing the dispensing vessel and its opening, it is possible to ensure that after operation the dispensing vessel needs no cleaning before being refilled with the next charge of resin.

In the encapsulation of electronic components by a settable resin, it is important to ensure that no air is trapped in the resin and/or in the cavity. Preferably therefore the resin to be introduced into the cavity is degassed before being placed in the dispensing vessel.

According to a second aspect of the invention there is provided apparatus for encapsulating components in an encapsulating liquid, the apparatus comprising a plurality of dispensing vessels each having a dispensing opening, the dimensions of the dispensing openings being such that encapsulating liquid will not flow therethrough under normal gravitational conditions but will flow therethrough when centrifugal force is applied, a vacuum centrifuge, chambers defining cavities within which the components will be encapsulated, and means for locating the dispensing vessels and the chambers in the vacuum centrifuge so that when the centrifuge is operating the cavities are evacuated and are located radially outward of, and out of contact with, the dispensing openings of the dispensing vessels such that when the liquid is drawn out of the dispensing openings on application of centrifugal force through centrifuge operation, the liquid will flow into the cavities and around the components in the cavities to encapsulate the components.

Conveniently the dispensing vessel comprises a cup with an open top and a narrow bore in its base to form the dispensing opening. A measured quantity of liquid resin can be placed in the cup through the open top, and will be prevented from flowing out through the opening under normal gravitational conditions by surface tension or suitable rheology.

In a preferred embodiment the dispensing vessels and the chamber support locations are mounted together in swing-out buckets so that the open tops of the dispensing vessels are uppermost until the centrifuge starts to operate, so that there is no danger of the liquid resin running out of the open top of the dispensing cups before the centrifuge starts to operate. However when the resin is particularly viscous or thixotropic it may be possible to use dispensing vessels which are radially directed at all times, rather than only during centrifuge operation.

Preferably the step of measuring the quantity of liquid resin to be introduced into the dispensing vessel takes place under atmospheric conditions and the centrifuging operation takes place under vacuum conditions.

The invention will now be further described, by way of example, with reference to the accompanying drawings, in which:

FIGS. 4a, 4b and 4c are sections through the apparatus of FIG. 3, showing three different stages in the operation of the apparatus;

FIGS. 5a, 5b, 5c, 5d and 5e show five sequential stages in the operation of an alternative form of apparatus in accordance with the invention;

FIGS. 6a and 6b show one method of measuring the quantity of liquid placed in the dispensing vessel.

Figure 1:
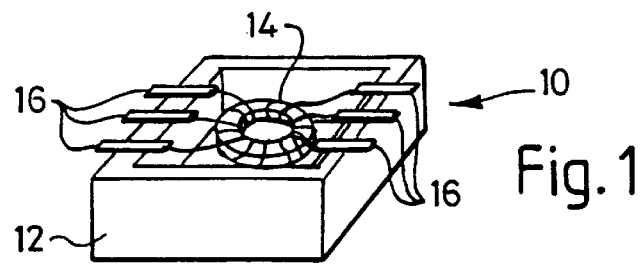
FIG. 1 is a perspective view of an electronic component to be encapsulated.

FIG. 1 shows an electronic component 10, before encapsulation. The component comprises an open topped housing 12 in which a toroidal, wound magnetic core 14 is placed. The windings around the core 14 are connected to component terminals 16. The component 10 as shown in FIG. 1 is operatively complete, but it is normal to fill the space within the casing 12 with an encapsulating resin to encapsulate the core 14 to protect the component and to fill all internal interstices with insulation.

The invention is in no way restricted by the nature of the contents of the housing 12.

The principle of encapsulation of such components is well known. However it is often difficult to perform satisfactory encapsulation, particularly with very small components. The resins used for encapsulation (typically filled epoxy resins although the man skilled in the art will be aware of the wide variety of resins which can be used for this purpose) are viscous and do not flow easily into small cavities. It is also necessary to ensure that the terminals 16 are kept clear of resin.

Figure 2:
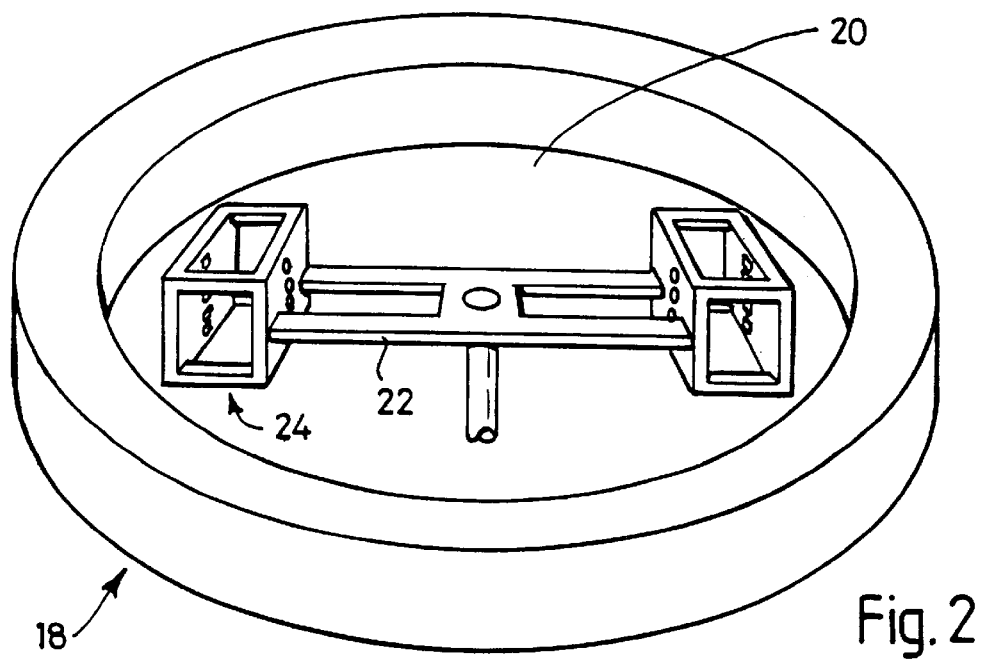
FIG. 2 is a schematic view of apparatus in accordance with the invention.

FIG. 2 shows a centrifuge generally designated 18 with a chamber 20 in which a vacuum can be maintained. The centrifuge has a rotor 22 and at each end of this rotor a frame 24 is mounted. When the rotor 22 rotates, the frames 24 are subjected to centrifugal force so that components mounted in the frame can be filled with resin, as will be described in the following.

Figure 3:
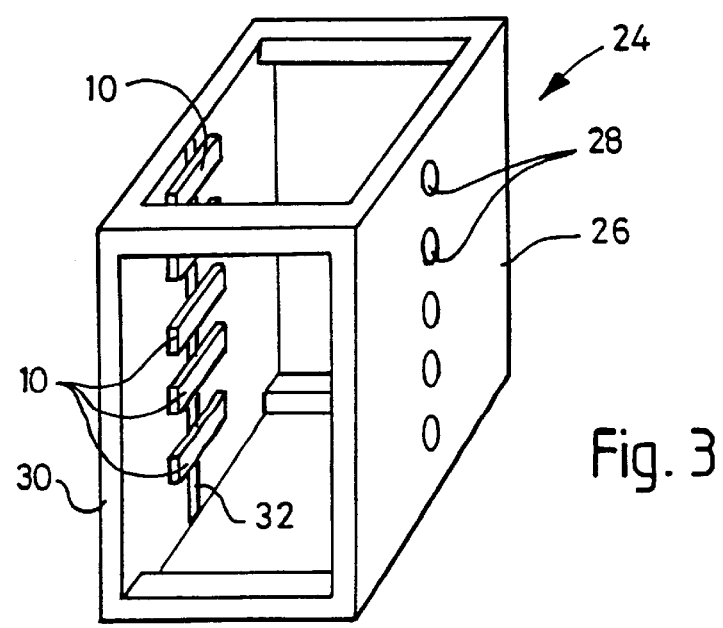
FIG. 3 is a detailed perspective view of part of the apparatus of FIG. 2.

FIG. 3 shows one of these cages 24 on a larger scale. The cage has an inner plate 26 in which a plurality of dispensing vessels 28 are formed. The cage also has an outer plate 30 with a mounting track 32 on which a plurality of components 10 are mounted. The components 10 are accurately positioned on a radial line of the centrifuge rotor passing through the centre of each of the dispensing-vessels 28.

In operation, resin 38 mixed with catalyst is charged into all the dispensing vessels 28 (see FIG. 4a). Each dispensing vessel has a cup-like chamber 34 and a narrow neck 36 which forms a dispensing opening. The rheology of the resin 38 in the cup 34 is designed to be sufficient to ensure that the resin does not drip out of the cup when the cup is oriented as shown in FIGS. 4.

When the centrifuge operates and the cage 24 is spun, the resin is forced out through the opening 36 under centrifugal force and enters the component 10 as shown in FIG. 4b. When all the resin has passed out of the cup 34 into the component, the component will be completely filled as shown in FIG. 4c and the quantity of resin initially charged into the cup 34 will be the same as that required to fill the component 10 to the desired level.

An apparatus as described is satisfactory for use where the resin has a high viscosity or thixotropy. However if the rheology of the resin is such that there might be a tendency for the resin to run out of the cup or component when the centrifuge has insufficient rotational speed, the cup and the associated component may be mounted together in a "swing-out bucket" arrangement as shown in FIGS. 5. FIG. 5a shows two cups 34a and 34b located vertically above two components 10a and 10b. In this position a force equal to gravity acts on the mass of the resin, and this force is insufficient to cause the resin to flow through the dispensing opening 36.

Alternatively, if the rheology of the resin and the shape of the cup and component are such that the resin will be retained in the component by surface tension, but might run out of the cup, then the cup can be fitted with a cap to retain the resin until centrifugal force is applied. If the centrifuging step is carried out under atmospheric conditions, the cap would need to be vented.

However once the centrifuge rotor accelerates, the angle of the swing-out buckets progressively changes the orientation of the cups 34a, 34b and of the components 10a and 10b to the position shown in FIG. 5b. Once the centrifuge reaches a threshold speed when a centrifugal force typically of 100g is generated, the resin will flow through the openings 36 into the components as shown in FIG. 5c. Once all the resin has flowed into the components as shown in FIG. 5d, the speed of the rotor is gradually reduced to zero and the angle of the swing-out buckets is progressively reduced in a controlled fashion to the rest position shown in FIG. 5e, to ensure that the resin does not run out of the component as the centrifuge slows down.

It is an important feature of the invention that the quantity of resin charged into each cup 34 is that quantity required to precisely fill the component 10 to a desired level. If the metering of resin into the cup is carried out at atmospheric pressure, then considerable metering accuracy is possible. Alternatively however the exact quantity of resin can be introduced by dimensioning each cup 34 so that it will hold exactly the correct amount of resin, and then using a doctor blade 40 to wipe across the top of each cup to produce a uniform level of filling, as shown in FIGS. 6a and 6b.

In another embodiment of apparatus in accordance with the invention, the centrifuge has four relatively rotatable rings. A first ring 42 carries the components 10. A second ring 44 is divided to define chambers 46 (FIG. 7a) of specified dimensions to accommodate a precise volume of resin. The ring 44 can be moved relative to a third ring 48 between two positions to either admit resin from a central reservoir 50 to the chambers 46, or to close the chambers so that no resin can be admitted.

The apparatus also includes a fourth ring 52 in which dispensing openings 54 are formed opposite the location of components 10.

Figure 7A:
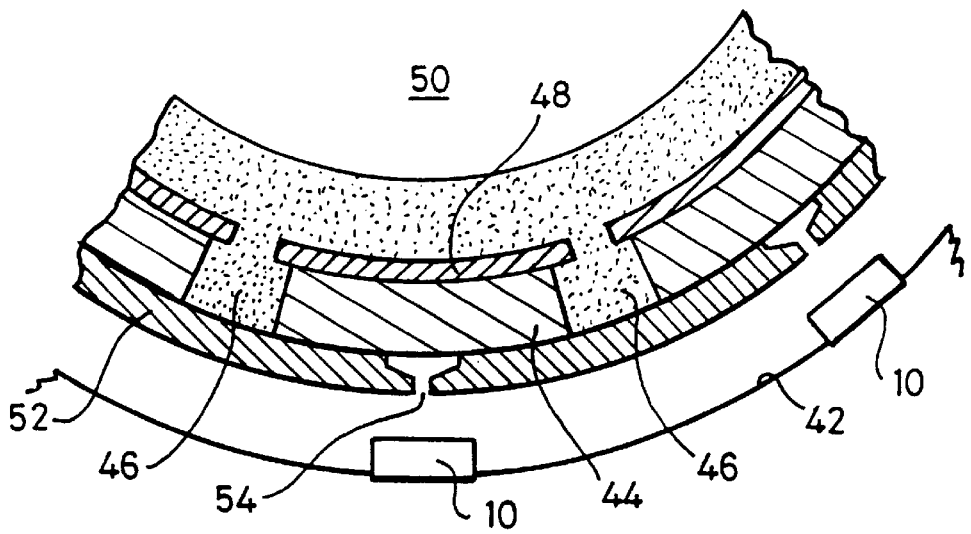
FIGS. 7a, 7b and 7c show three sequential stages in the operation of a third embodiment of apparatus in accordance with the invention.

During the initial operation of the centrifuge, as shown in FIG. 7a, the ring 44 is moved so that resin can flow into the chambers 46.

Figure 7B:
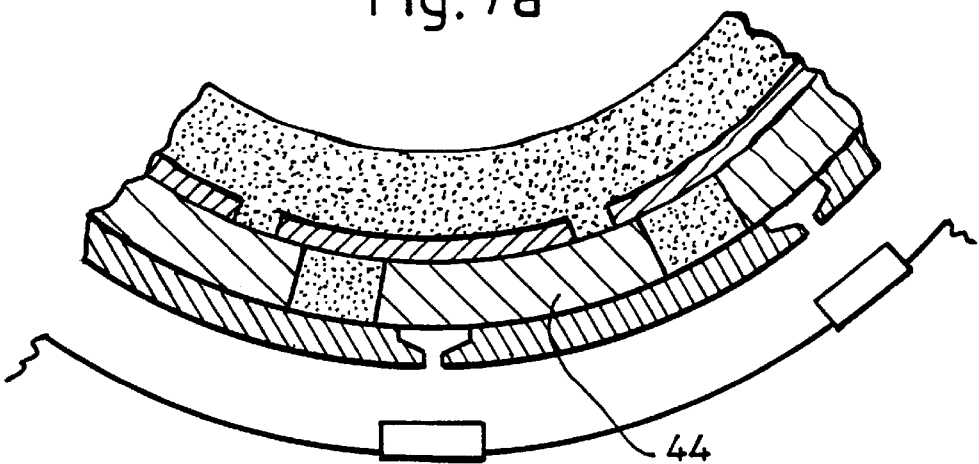
Figure 7C:
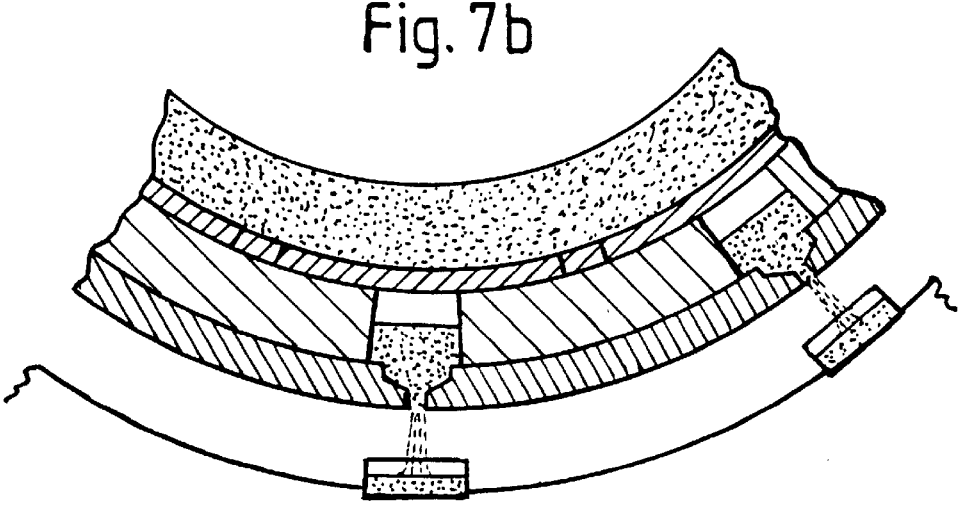

In a second stage, shown in FIG. 7b the ring 44 is moved so that the chambers 46 are closed and a defined volume of resin is trapped therein.

In a third stage the ring 44 is moved until the chambers 46 line up with the dispensing openings 54, and in this position the centrifugal force arising from centrifuge rotation results in the resin being forced out of the chambers into the components 10, in a manner similar to that already described.

The invention thus allows accurate and rapid filling of electronic components with a settable resin. As already pointed out however the invention is not limited to this application.

It is a particular advantage of the present invention that the cycle time for the filling of each component is significantly less than that required by prior art methods.

I claim:

1. A method of encapsulating components in a housing with an encapsulating liquid, the method comprising the steps of a. locating components in respective housings, each housing having walls defining a cavity with an open top, b. providing a separate dispensing vessel with a dispensing opening for each housing, c. placing into each dispensing vessel the quantity of liquid required to encapsulate the components in the associated housing, d. placing the housings and the dispensing vessels into a centrifuge so that the opening of each housing, when the centrifuge is operating, lies radially outside of a dispensing opening of the dispensing vessel, with the housing walls surrounding each cavity opening being out of contact with the dispensing vessel, e. evacuating the centrifuge so that air is evacuated from the cavity before the liquid is introduced, f. operating the centrifuge so that all the liquid flows out of the dispensing opening, into the cavity and around the component through centrifugal force.

2. A method as claimed in claim 1, wherein the liquid is degassed before being placed in the dispensing vessel.

3. A method as claimed in claim 1, wherein the liquid is an encapsulating resin.

4. A method as claimed in claim 2, wherein the liquid is an encapsulating resin.

5. A method as claimed in claim 1, wherein the step of placing into each dispensing vessel the quantity of liquid, required to encapsulate the components in the associated housing takes place under atmospheric conditions and the centrifuging operation takes place under vacuum conditions.

6. A method as claimed in claim 2, wherein the step of placing into each dispensing vessel the quantity of liquid required to encapsulate the components in the associated housing takes place under atmospheric conditions and the centrifuging operation takes place under vacuum conditions.

7. A method as claimed in claim 3, wherein the step of placing into each dispensing vessel the quantity of liquid required to encapsulate the components in the associated housing takes place under atmospheric conditions and the centrifuging operation takes place under vacuum conditions.

8. A method as claimed in claim 4, wherein the step of placing into each dispensing vessel the quantity of liquid required to encapsulate the components in the associated housing takes place under atmospheric conditions and the centrifuging operation takes place under vacuum conditions.

9. Apparatus for encapsulating components in an encapsulating liquid, the apparatus comprising a plurality of dispensing vessels each having a dispensing opening, the dimensions of the dispensing openings being such that encapsulating liquid will not flow therethrough under normal gravitational conditions but will flow therethrough when centrifugal force is applied, a vacuum centrifuge, means for supporting a plurality of open-topped housings defining cavities within which the components will be encapsulated, and means for locating the dispensing vessels in the vacuum centrifuge so that when the open-topped housings are in position and the centrifuge is operating the cavities in the housings are evacuated and the open tops of the housings are located radially outward of, and out of contact with, the dispensing openings of the dispensing vessels such that when the liquid is drawn out of the dispensing openings on application of centrifugal force through centrifuge operation, the liquid will flow into the cavities and around the components in the cavities to encapsulate the components.

10. Apparatus as claimed in claim 9, wherein the dispensing vessel comprises a cup with an open top and a bore in its base to form the dispensing opening.

11. Apparatus as claimed in claim 9, wherein the dispensing vessels and the supporting means for the open-topped housings are mounted together in swing-out buckets so that the open tops of the dispensing vessels are uppermost until the centrifuge starts to operate.

12. Apparatus as claimed in claim 10, wherein the dispensing vessels and the supporting means for the open-topped housings are mounted together in swing-out buckets so that the open tops of the dispensing vessels are uppermost until the centrifuge starts to operate.

13. Encapsulating apparatus for encapsulating components located in housings with a viscous liquid wherein the housings each have an open face, the components are located in the housings but do not occupy all the internal space in the housing, and the unoccupied internal space is to be filled with the viscous liquid to encapsulate the component, the apparatus comprising:

a vacuum centrifuge;

housing locating means for locating the housings in the centrifuge;

a plurality of dispensing vessels with the number of dispensing vessels being the same as the number of housings, the dispensing vessels each having an internal volume equal to the volume of the unoccupied internal space to be filled in the corresponding housings;

each dispensing vessel having a filling opening and a dispensing opening;

providing a cage for supporting the dispensing vessels, and the housing locating means in the centrifuge so that:

when the centrifuge is not operating, the dispensing vessels are positioned with their filling openings uppermost and when the centrifuge is operating, the dispensing vessels are positioned with their dispensing openings facing radially outward and the housing locating means are positioned so that the housings held by the locating means are located aligned with, but out of contact with the dispensing openings of the corresponding dispensing vessels.

14. Apparatus as claimed in claim 13, wherein the dispensing vessel comprises a cup with an open top and a bore in its base to form the dispensing opening.

15. Apparatus as claimed in claim 13, wherein the dispensing vessels and the supporting means for the open-topped housings are mounted together in swing-out buckets so that the open tops of the dispensing vessels are uppermost until the centrifuge starts to operate.

16. A method of encapsulating components located in housings with a viscous liquid wherein the housings each have an open face, each component is located in a housing but does not occupy all the internal space in the housing, and the unoccupied internal space is to be filled with the viscous liquid to encapsulate the component, the method comprising the steps of:

placing each component in a housing;

locating the housings in a vacuum centrifuge;

filling with viscous liquid a dispensing vessel which has a filling opening, and a dispensing opening, and the volume of liquid filled into each vessel being substantially the same as the volume of the unoccupied internal space to be filled in the housing;

locating the dispensing vessels in the vacuum centrifuge with each dispensing vessel corresponding with a single housing and being spaced from the corresponding housing;

evacuating the centrifuge;

operating the centrifuge so that liquid is drawn out of the dispensing vessel by centrifugal force to enter the housing;

continuing centrifuge operating until all the liquid has been drawn from each dispensing vessel and has entered the corresponding housing; and stopping the centrifuge and removing the housings.

17. A method as claimed in claim 16, wherein the liquid is degassed before being placed in the dispensing vessel.

18. A method as claimed in claim 16, wherein the liquid is an encapsulating resin.

19. A method as claimed in claim 16, wherein the step of placing into each dispensing vessel the quantity of liquid required to encapsulate the components in the associated housing takes place under atmospheric conditions and the centrifuging operation takes place under vacuum conditions.

* * * * *